US009250457B2

(12) United States Patent
Park et al.

(10) Patent No.: US 9,250,457 B2
(45) Date of Patent: Feb. 2, 2016

(54) DRIVER FOR LIQUID CRYSTAL LENS, IMAGING APPARATUS AND TEMPERATURE CONTROLLING METHOD THEREOF

(71) Applicant: DONGWOON ANATECH CO., LTD., Seoul (KR)

(72) Inventors: Jung-wan Park, Seoul (KR); Jung-ho Jin, Hwaseong (KR); Eun-tack Oh, Seongnam (KR)

(73) Assignee: DONGWOON ANATECH CO., LTD., Seoul (KR)

( * ) Notice: Subject to any disclaimer, the term of this patent is extended or adjusted under 35 U.S.C. 154(b) by 334 days.

(21) Appl. No.: 13/687,591

(22) Filed: Nov. 28, 2012

(65) Prior Publication Data

US 2013/0148059 A1 Jun. 13, 2013

(30) Foreign Application Priority Data

Dec. 8, 2011 (KR) ........................ 10-2011-0131173

(51) Int. Cl.
*G02F 1/133* (2006.01)
*G02F 1/1333* (2006.01)
(Continued)

(52) U.S. Cl.
CPC ...... *G02F 1/13306* (2013.01); *G02F 1/133382* (2013.01); *G01D 3/028* (2013.01);
(Continued)

(58) Field of Classification Search
CPC .......... G02F 1/13306; G02F 1/133382; G02F 2203/60; G02F 2203/28; G02F 2201/294; G02F 1/29; G01D 3/028; G09G 2320/041
USPC .......................................................... 349/200
See application file for complete search history.

(56) References Cited

U.S. PATENT DOCUMENTS

| | | | |
|---|---|---|---|
| 4,795,248 A | 1/1989 | Okada et al. |
| 7,910,868 B2 | 3/2011 | Suzuki et al. |

(Continued)

FOREIGN PATENT DOCUMENTS

| | | |
|---|---|---|
| CN | 1936625 | 3/2007 |
| CN | 101010611 | 8/2007 |

(Continued)

OTHER PUBLICATIONS

Kawada et al., Automatic Focusing Device, Dec. 13, 2007, Machine translation of JP 2007-322625 A from JPO AIPN website, All pages.*

(Continued)

*Primary Examiner* — Dennis Y Kim
(74) *Attorney, Agent, or Firm* — Staas & Halsey LLP

(57) ABSTRACT

A driver for a liquid crystal lens, an imaging apparatus and a temperature controlling method thereof, include: a liquid crystal lens which adjusts a focal length according to a voltage applied thereto; a lens driver which applies the voltage to the liquid crystal lens; a sensor driver which detects a temperature of the liquid crystal lens, compensates for the detected temperature, and determines whether the compensated temperatures maintains a preset range for the driver for the liquid crystal lens to perform a control operation; and a heater driver which, according to the determination by the sensor driver, controls heat generation of the liquid crystal lens to maintain a temperature of the liquid crystal lens in the preset range. Thus, the driver detects a temperature of the liquid crystal lens accurately by compensating for a resistance value from the liquid crystal lens to thereby maintain stability of the imaging apparatus.

11 Claims, 11 Drawing Sheets

(51) Int. Cl.
*G02F 1/29* (2006.01)
*G01D 3/028* (2006.01)

(52) U.S. Cl.
CPC ............ *G02F 1/29* (2013.01); *G02F 2001/294* (2013.01); *G02F 2203/28* (2013.01); *G02F 2203/60* (2013.01); *G09G 2320/041* (2013.01)

(56) References Cited

U.S. PATENT DOCUMENTS

| | | | | |
|---|---|---|---|---|
| 2003/0193642 | A1* | 10/2003 | Tominaga et al. | 349/196 |
| 2007/0024801 | A1 | 2/2007 | Horiuchi et al. | |
| 2007/0279365 | A1* | 12/2007 | Kageyama | G02B 7/38 345/100 |
| 2008/0088756 | A1 | 4/2008 | Tseng et al. | |
| 2010/0123510 | A1* | 5/2010 | Yoshikawa | 327/512 |
| 2010/0194970 | A1* | 8/2010 | Kageyama | 348/349 |
| 2011/0109824 | A1* | 5/2011 | Galstian | 349/33 |

FOREIGN PATENT DOCUMENTS

| | | | |
|---|---|---|---|
| EP | 0012479 | A1 | 6/1980 |
| JP | 2007322625 | A * | 12/2007 |

OTHER PUBLICATIONS

Extended European Search Report mailed Mar. 11, 2013 in corresponding European Application No. 12195736.9.

Chinese Office Action dated Jan. 4, 2015 from Chinese Patent Application No. 201210528563.9, 21 pages.

* cited by examiner

DRIVER FOR LIQUID CRYSTAL LENS, IMAGING APPARATUS AND TEMPERATURE CONTROLLING METHOD THEREOF

CROSS-REFERENCE TO RELATED APPLICATION

This application claims priority from Korean Patent Application No. 10-2011-0131173, filed on Dec. 8, 2011 in the Korean Intellectual Property Office, the disclosure of which is incorporated herein by reference.

BACKGROUND

1. Field

Apparatuses and methods consistent with the exemplary embodiments relate to a driver for a liquid crystal lens, an imaging apparatus and a temperature controlling method thereof, and more particularly, to a driver for a liquid crystal lens, an imaging apparatus and a temperature controlling method thereof which controls a temperature of a tunable liquid crystal lens to maintain a predetermined range.

2. Description of the Related Art

An imaging apparatus including a camera lens such as a mobile phone may employ a tunable liquid crystal lens which controls a focal length of a camera through an electric control of the liquid crystal lens to downsize the imaging apparatus.

The liquid crystal lens performs an auto focus by which the focal length is adjusted according to a frequency of a voltage applied to the liquid crystal lens. To smoothly adjust the focal length, the temperature of the liquid crystal lens should be maintained consistently.

To do so, the imaging apparatus having the liquid crystal lens includes a heater to generate heat by the voltage applied thereto and a sensor to read a resistance value according to the temperature of the liquid crystal lens to detect the temperature of the liquid crystal lens.

To maintain the temperature of the liquid crystal lens in a predetermined range, the temperature of the liquid crystal lens should be detected accurately.

However, it is difficult for the liquid crystal lens having the sensor including a capacitor and a resistor to read a resistance value accurately.

SUMMARY

Accordingly, one or more exemplary embodiments provide a driver for a liquid crystal lens, an imaging apparatus and a temperature controlling method thereof which compensates for a resistance value read by the liquid crystal lens and accurately detects a temperature of the liquid crystal lens to maintain stability of the imaging apparatus.

Another exemplary embodiment is to provide a driver for a liquid crystal lens, an imaging apparatus and a temperature controlling method thereof which compensates for a voltage error which occurs by a capacitor of a sensor receiving a voltage of the liquid crystal lens, and compensates for the voltage of the liquid crystal lens by simple calculation at the time when power is supplied to the sensor, to thereby measure and control temperature accurately.

The foregoing and/or other aspects may be achieved by providing a driver for a liquid crystal lens including: a liquid crystal lens which adjusts a focal length according to a voltage applied thereto; a lens driver which applies the voltage to the liquid crystal lens; a sensor driver which detects a temperature of the liquid crystal lens, compensates for the detected temperature, and determines whether the compensated temperatures maintains a preset range for the driver for the liquid crystal lens to perform a control operation; and a heater driver which, according to the determination by the sensor driver, controls heat generation of the liquid crystal lens to maintain a temperature of the liquid crystal lens in the preset range.

The driver may further include a sensor which includes a capacitor and a resistor and receives a voltage of the liquid crystal lens, and the sensor driver may detect a temperature of the liquid crystal lens by receiving a voltage of the sensor, calculate the temperature of the liquid crystal lens at the time when the sensor receives a voltage of the liquid crystal lens by detecting the voltage of the sensor, and compensate for a voltage error which arises due to the capacitor.

The driver may further include a heater which generates heat according to a control of the heater driver, wherein the liquid crystal lens, the sensor and the heater form a single chip including five terminals.

The five terminals may be connected to one of the lens driver, the sensor driver and the heater driver to transmit and receive a signal.

Four of the five terminals may be connected to one of the lens driver, the sensor driver and the heater driver to transmit and receive a signal and the remaining one of the five terminals may be grounded.

The lens driver may adjust a frequency of a voltage applied to the liquid crystal lens to adjust a focus of the liquid crystal lens.

The foregoing and/or other aspects may be achieved by providing a temperature controlling method of a driver for a liquid crystal lens including: detecting a temperature of a liquid crystal lens adjusting a focal length according to a voltage applied thereto; compensating for the detected temperature; determining whether the compensated temperature maintains a preset range for the driver for the liquid crystal lens to perform a control operation; and controlling heat generation of the liquid crystal lens according to the determination, to maintain the temperature of the liquid crystal lens in the preset range.

The driver may further include a sensor which includes a capacitor and a resistor and receives a voltage of the liquid crystal lens, and the detecting the temperature may includes detecting the temperature of the liquid crystal lens by receiving a voltage of the sensor, calculating a temperature of the liquid crystal lens by detecting a voltage of the liquid crystal lens and compensating for a voltage error which arises due to the capacitor.

The foregoing and/or other aspects may be achieved by providing an imaging apparatus including: a liquid crystal lens which adjusts a focal length according to a voltage applied thereto; a lens driver which applies the voltage to the liquid crystal lens; a sensor driver which detects a temperature of the liquid crystal lens, compensates for the detected temperature and determines whether the compensated temperature maintains a preset range for the imaging apparatus to perform a control operation; a heater driver which controls heat generation of the liquid crystal lens to maintain the temperature of the liquid crystal lens in the preset range according to the determination of the sensor driver; an imaging sensor which detects an image transmitted by the liquid crystal lens; and an image processor which processes an image obtained through the image sensor.

The lens driver adjusts a frequency of a voltage applied to the liquid crystal lens to adjust a focus of the liquid crystal lens.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
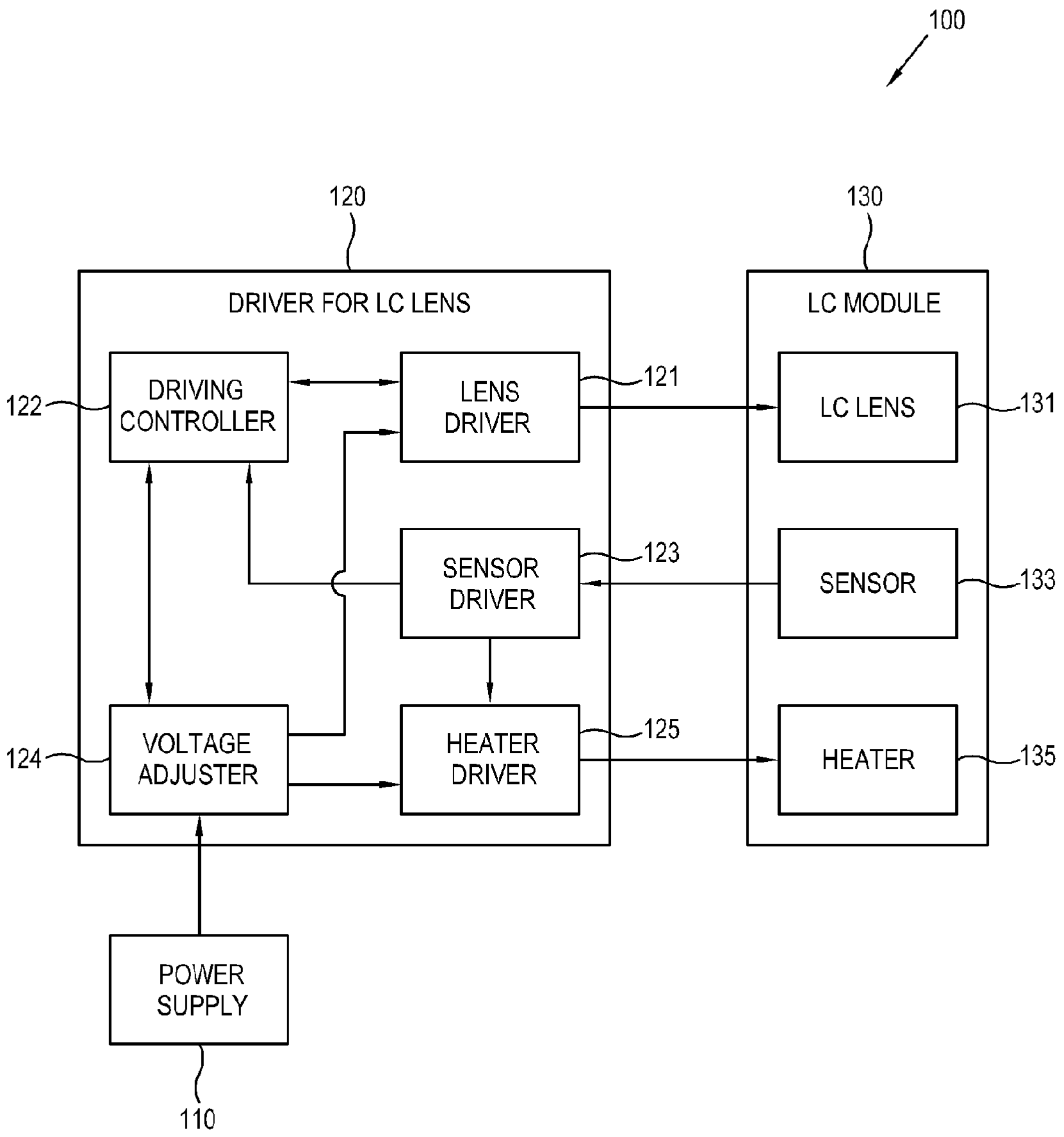
FIG. 1 is a block diagram of an imaging apparatus according to an embodiment.

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout.

FIG. 1 is a block diagram of an imaging apparatus 100 according to an embodiment.

The imaging apparatus 100 according to the embodiment includes a liquid crystal (LC) lens 110 which adjusts a focal length according to a voltage applied thereto. The LC lens 110 may be implemented as a tunable liquid crystal lens (TLCL) which adjusts a focal length according to a voltage applied thereto.

The imaging apparatus 100 according to the embodiment may be implemented as a mobile phone, a portable multimedia device or a digital camera having an LC lens.

As shown in FIG. 1, the imaging apparatus 100 includes a power supply 110 which supplies power, a driver for liquid crystal lens (driver) (120) which applies a voltage supplied by the power supply 110, to a liquid crystal (LC) module 130 including an LC lens 131, and the LC module 130 which receives the voltage from the driver 120.

The LC module 130 includes the LC lens 131 a focal length of which is changed depending on a frequency of a voltage applied thereto, a sensor 132 which receives a voltage from the LC lens 131 to detect a temperature of the LC lens 131, and a heater 133 which generates heat according to the voltage applied. The temperature of the LC lens 131 is adjusted by the heat generated by the heater 133.

The driver 120 may include a lens driver 121 which supplies a voltage to the LC lens 131 to adjust a focus, a driving controller 122 which controls power supplied to the lens driver 121, a sensor driver 123 which reads a voltage value of the sensor 132 and detects the temperature of the LC lens 131, a heater driver 125 which controls the heat generation by the heater 135 for the LC lens 131 to maintain its temperature within a predetermined range, and a voltage adjuster 124 which selectively amplifies power supplied by the power supply 110 and supplies the power to elements of the driver 120. The voltage adjuster 124 may be implemented as a charge pump which operates in a predetermined mode (e.g., in 2× mode).

The imaging apparatus 100 may further include an image sensor (not shown) which detects an image transmitted by the LC lens 131, an image processor (not shown) which processes the image obtained through the image sensor, and an interface (not shown) which is used as an I/O interface for the elements. The image sensor may be implemented as a CCD/CMOS image sensor.

The lens driver 121 receives a voltage from the power supply 110 and applies a voltage in a predetermined frequency to the LC lens 131. The frequency of the voltage applied to the LC lens 131 is determined for an auto focus of the LC lens 131.

More specifically, the driving controller 122 may calculate a distance from an object by detecting ultrasonic waves or infrared rays through the image sensor, and determine a corresponding frequency by calculating an optimum focal length according to the calculated distance.

The lens driver 121 applies to the LC lens 131 the power in the frequency determined by the control of the driving controller 122, to thereby perform auto focus.

The lens driver 121 may applies power with 20 to 30V to the LC lens 131 at a predetermined interval corresponding to the frequency determined by the driving controller 122. The lens driver 121 may include an H-bridge circuit employing MOSFET such as PMOS or NMOS.

The driving controller 122 may calculate the distance from the object and the optimum focal length by Through-the-lens (TTL) contrast detection method by which the contrast of the object is detected through the image sensor or by phase difference detection method by which light transmitted by the LC lens 131 is divided into two parts for comparison, rather than by using additional ultrasonic waves or infrared rays.

The operational speed of the auto focus is changed depending on the temperature of the LC lens 131. Accordingly, to efficiently perform the control of the driver 120 including the auto focus, the LC lens 131 needs to maintain its temperature within a predetermined range, e.g., at approximately 40 to 50° C. that is higher than normal temperature.

Figure 2:
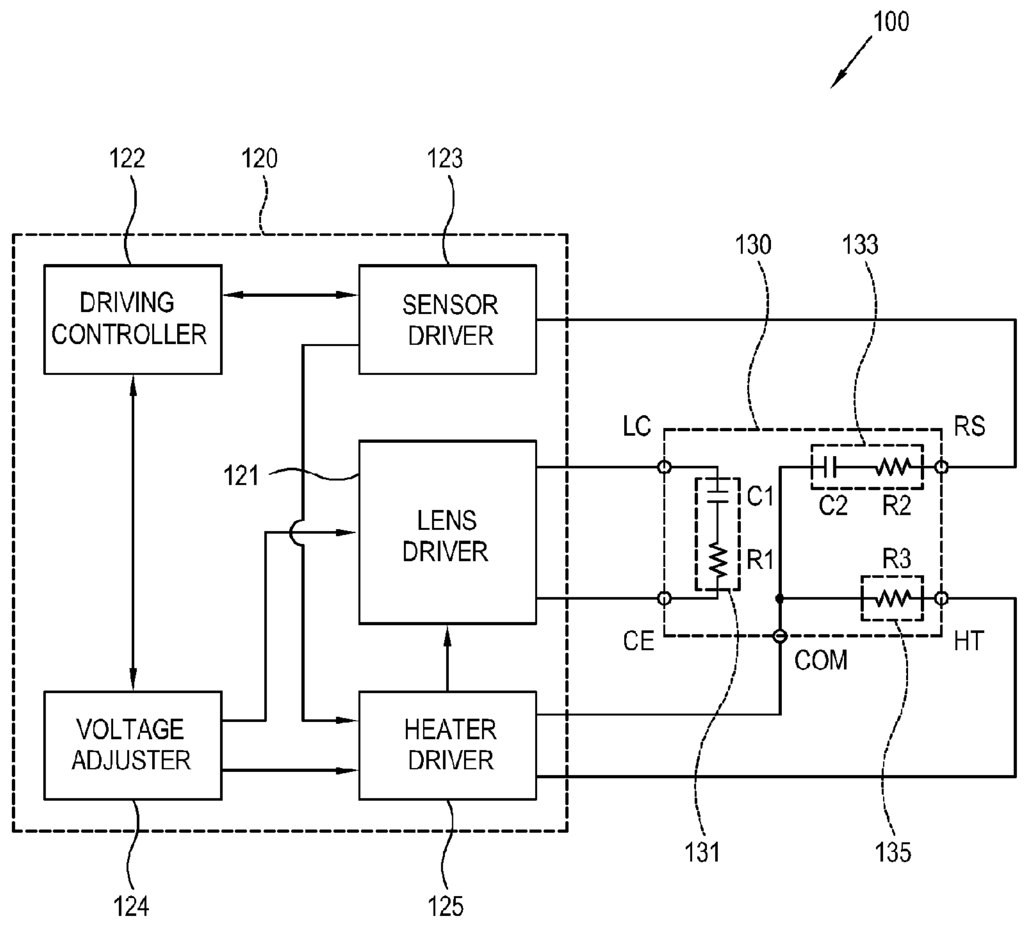
FIG. 2 is a detailed view of a liquid crystal (LC) module of the imaging apparatus according to the embodiment.

FIG. 2 is a detailed view of the LC module 130 of the imaging apparatus 100 according to the embodiment.

The LC module 130 in FIG. 2 is different from an LC module according to another embodiment in FIG. 8 (which is connected to a heater driver 125) in that one end of the heater 135 (to be described later) is grounded. The heater 135 in FIG. 2 may receive a ground voltage from the heater driver 125 through a COM terminal.

As shown in FIG. 2, the LC lens 131 may include a capacitor C1 and a resistor R1. The sensor 133 may include a capacitor C2 and a resistor R2. The heater 135 may include a resistor R3.

As in FIG. 2, the LC module 130 according to the embodiment includes a single chip, and has five terminals LC, CE, RS, HT and COM which are connectable to the outside. The driver 120 which supplies power to the LC module 130 may also include a single chip having an H-bridge circuit.

The five terminals of the LC module 130 are connected to one of the lens driver 121, the sensor driver 123 and the heater driver 125 to transmit and receive a signal. More specifically, referring to FIG. 2, the lens driver 121 is connected to the LC and CE terminals and applies a voltage to the LC lens 131. The sensor driver 123 is connected to the RS terminal and detects a temperature of the sensor 133. The heater driver 125 is connected to the COM and HT terminals and applies a voltage to the hater 135 through the HT terminal to generate heat by the heater 135.

The heater driver 125 may supply power with 2.8 to 5V to the heater 135 for the LC lens 131 to maintain a proper temperature.

The sensor 133 as a sensor element includes the capacitor C2 and the resistor R2 to detect a voltage of the LC lens 131 as shown in FIG. 2.

Figure 3:
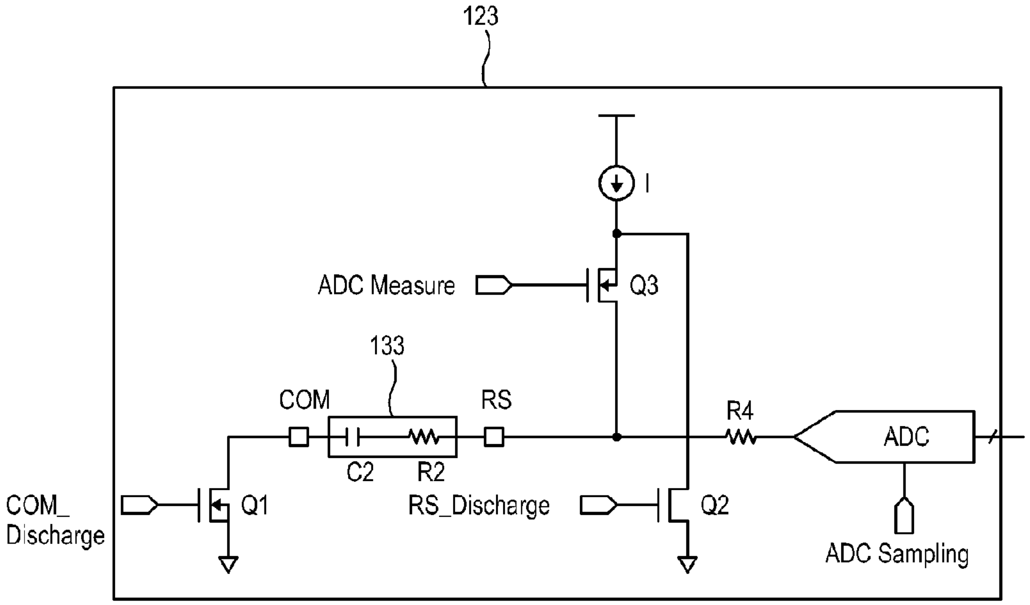
FIG. 3 is a circuit diagram explaining an operation of a sensor driver of the imaging apparatus according to the embodiment.
Figure 4:
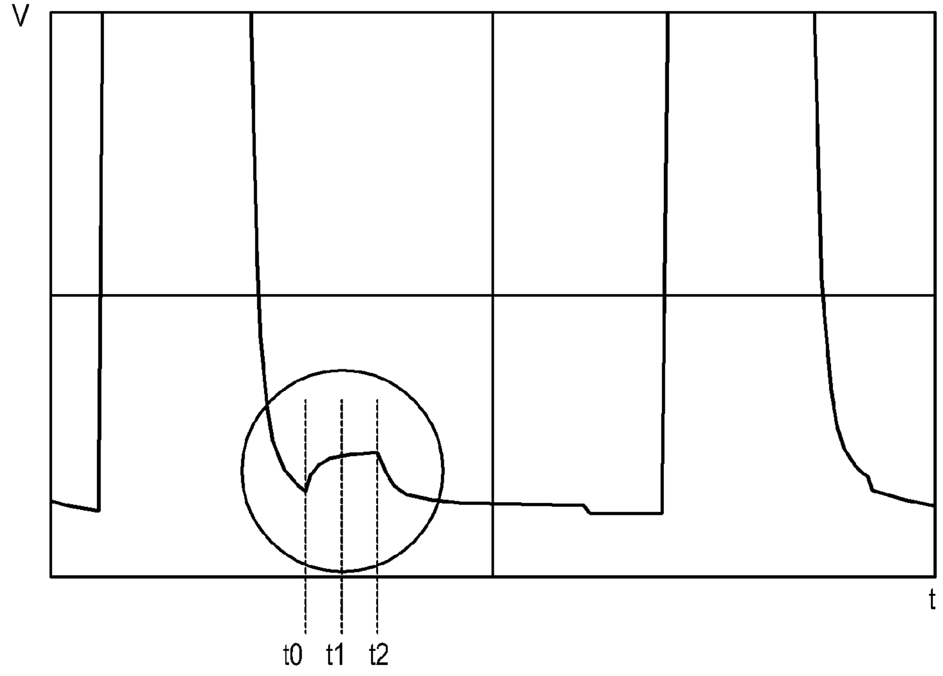
FIG. 4 is a graph showing a voltage detected by a sensor.
Figure 5:
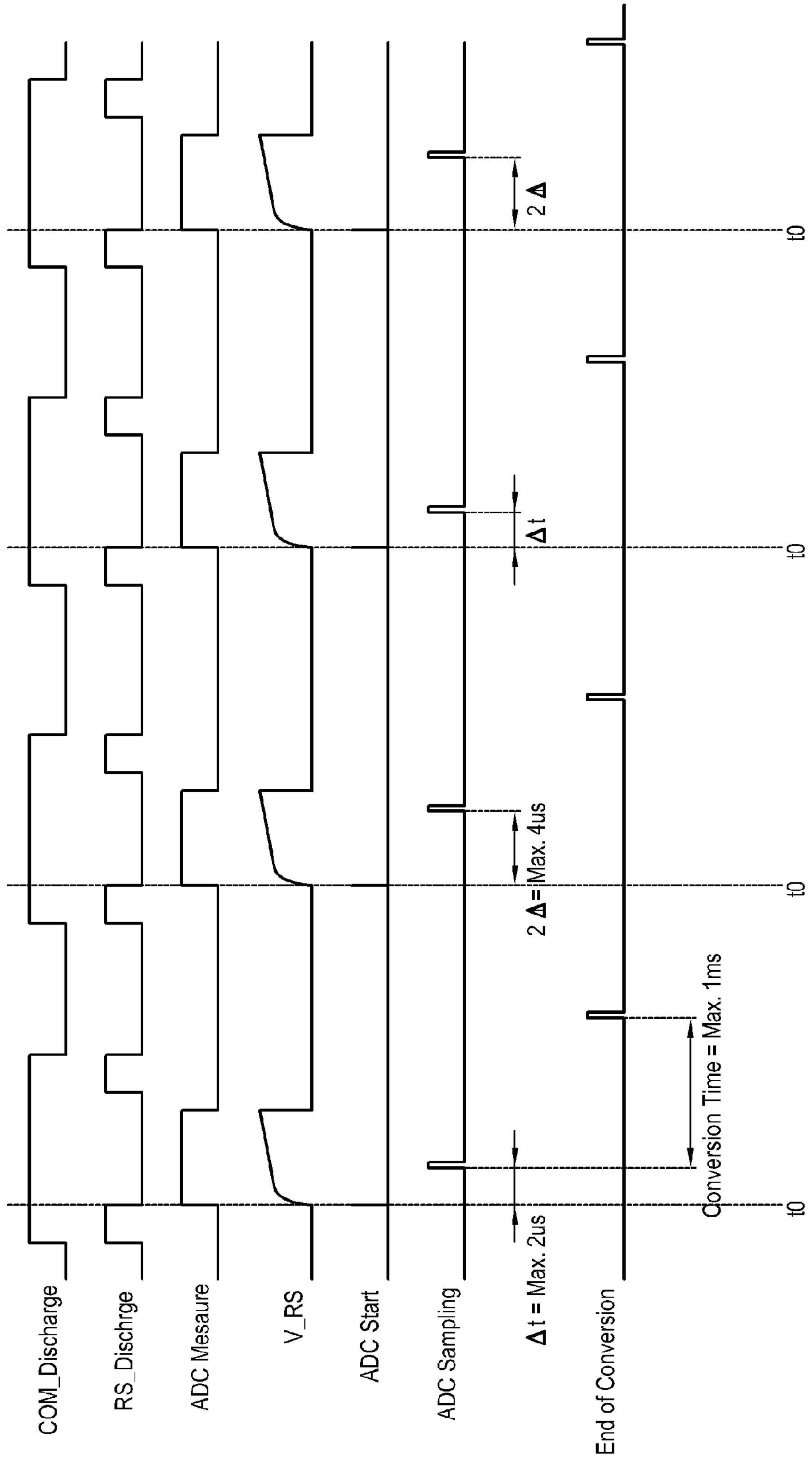
FIG. 5 is a graph sequentially showing a voltage detected in the circuit diagram in FIG. 3.
Figure 6:
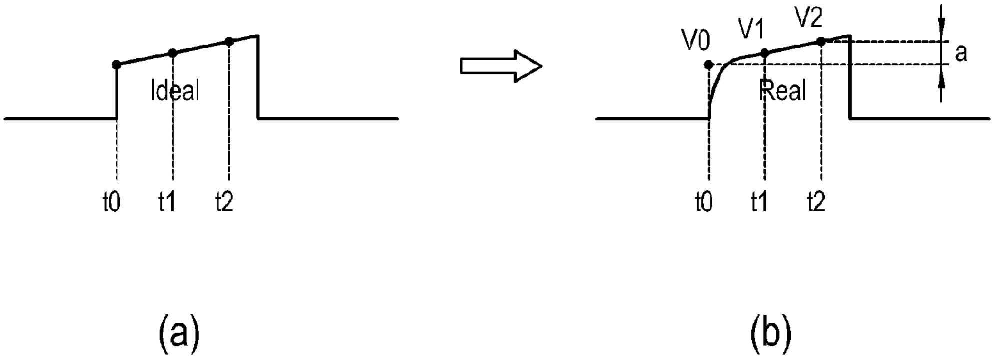
FIG. 6 is a graph explaining a voltage compensation method according to the embodiment.
Figure 7:
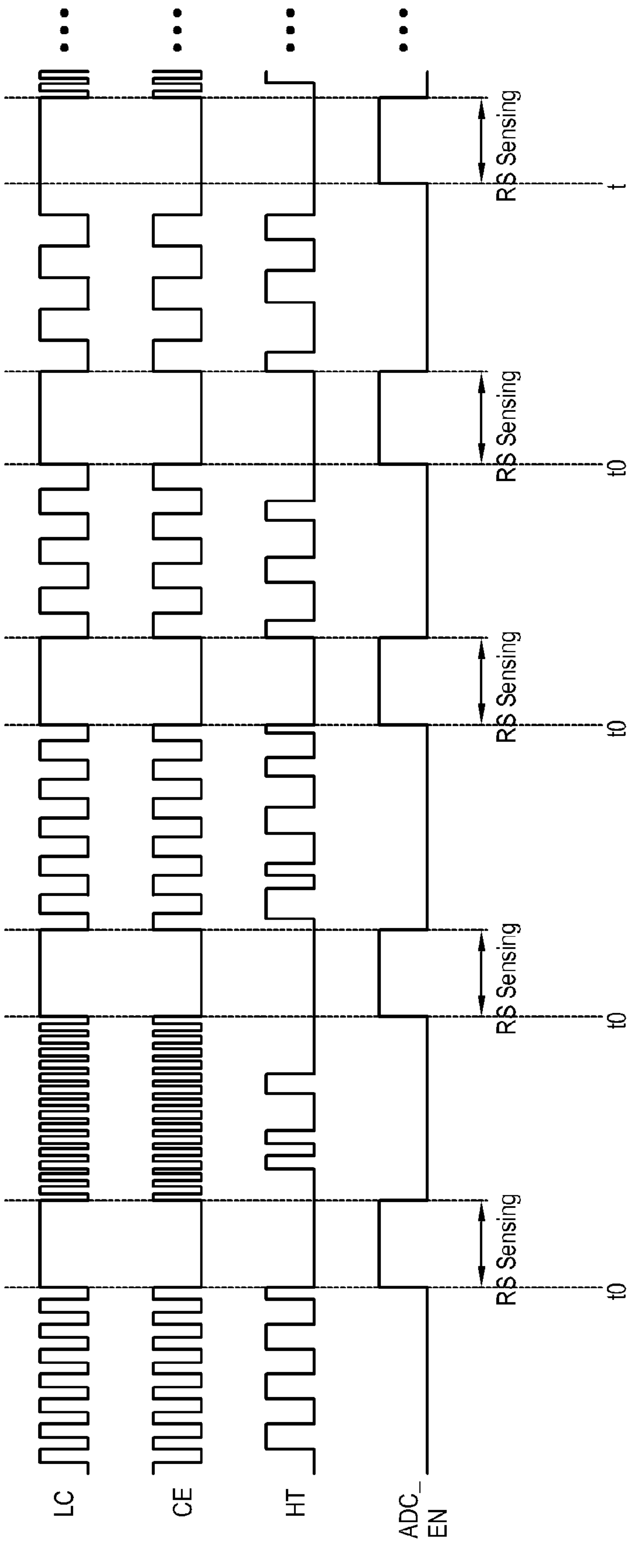
FIG. 7 is a graph explaining temperature sensing according to the embodiment.

FIG. 3 is a circuit diagram explaining an operation of the sensor driver 123 of the imaging apparatus 100 according to the embodiment. FIG. 4 is a graph showing a voltage detected by the sensor 133. FIG. 5 is a graph sequentially showing the voltage detected in the circuit diagram in FIG. 3. FIG. 6 is a graph explaining a voltage compensation method according to the embodiment. FIG. 7 is a graph explaining temperature sensing according to the embodiment.

The sensor 133 detects the voltage of the LC lens 131 and transmits the voltage to the sensor driver 123.

The sensor driver 123 includes an ADC converter which converts the power transmitted by the sensor 133, into a digital form.

As the sensor 133 includes the capacitor C2 as in FIGS. 2 and 3, the output voltage of the sensor 133 has such form as a voltage V in FIG. 4 and V_RS in FIG. 5, and due to occurrence of an error at t0 at which the sensor 133 receives the voltage from the LC lens 131, it is difficult to detect a voltage value accurately.

The sensor driver 123 detects the voltage of the LC lens 131 at a predetermined interval (ADC Sampling) (Δt) by using COM_Discharge, RS_Discharge and ADC Measure measured by the COM, RS and ADC as in FIGS. 3 and 5. The sensor driver 123 according to the embodiment may detect voltages V1 and V2 at t1 to which t0 elapses by Δt and at t2 to which t0 elapses by 2Δt, respectively.

To do the foregoing, Q1, Q2 and Q3 in FIG. 3 perform a switching operation. As shown in FIG. 5, the sensor driver 123 according to the embodiment may measure a voltage V_RS of the sensor 133 at the time when Q1 is turned on by the COM-Discharge signal and Q2 is turned off by the RS_Discharge signal and the ADC_Measure signal is turned on. The sensor driver 123 may further include a resistor R4 as in FIG. 3.

More specifically, to calculate a voltage falling under t0 of an ideal voltage without any effect from the capacitor C2 as in (a) in FIG. 6, the sensor driver 123 detects the voltages V1 and V2 at t1 and t2 as in (b) in FIG. 6 by using the ADC Sampling signal and deducts a falling under the difference between V1 and V2 from V1 to calculate the voltage V0 at t0.

The formula which is used for the aforementioned calculation is Formula 1 below.

$$V\_AFD\_RS(t_0)=I*R$$

$$V\_AFD\_RS(t_1)=I*R+(I/C*\Delta t)$$

$$V\_AFD\_RS(t_2)=I*R+(I/C*2\Delta t)$$

$$\Delta V\_RFD\_RS=VAFD\_RS(t_2)-V\_AFD\_RS(t_2)$$
$$=I*R+(I/C*2\Delta t)-I*R+(I/C*\Delta t)=(I/C*\Delta t)$$

$$\therefore V\_AFD\_RS(t_0)=V\_AFD\_RS(t_1)-\Delta V\_RFD\_RS$$

$$\text{or } V\_AFD\_RS(t_0)=V\_AFD\_RS(t_2)-2*\Delta V\_RFD\_RS \quad \text{[Formula 1]}$$

The sensor driver 123 determines whether the LC lens 131 maintains its temperature within a predetermined range, i.e., 40 to 50° C., by using the calculated V0.

The sensor driver 123 may use a lookup table (LUT) stored regarding the temperature corresponding to the calculated voltage value to determine whether the LC lens 131 maintains a proper temperature.

The sensor driver 123 outputs to the heater driver 125 a signal showing whether the LC lens 131 maintains a proper temperature. Based on the signal transmitted by the sensor driver 123, the heater driver 124 outputs a control signal to generate heat by the heater 135. The heater 135 may be implemented as a heating element.

The sensor driver 123 according to the embodiment periodically receives the voltage of the sensor 133 at every t0 in FIGS. 6 and 7, checks whether the LC lens maintains a proper temperature, and the results checked by the sensor driver 123 is provided as a feedback through the heater driver 125. Thus, the LC lens 131 according to the embodiment may continue to maintain a proper temperature.

As shown in FIG. 7, the sensor driver 123 detects the voltage of the sensor 133 at the time when no power is supplied to the heater 135, i.e., at the time when noise is minimized.

Referring to FIG. 7, the output signals LC and CE of the lens driver 121 and the output signal HT of the heater driver 125 are separately and independently output while the output signals LC and CE of the lens driver 121 are inversed therebetween. That is, the lens driver 121 and the heater driver 125 are driven independently.

The signals LC and CE which are input to the LC lens 131 are controlled to have a predetermined frequency to perform the auto focus, and the signal HT which is input to the heater 135 is controlled so that the heater 135 maintains a target temperature, i.e., 40 to 50° C.

More specifically, the driving controller 122 controls power supplied by the voltage adjuster 124 to the lens driver 121 and the heater driver 125, and controls the lens driver 121 and the heater driver 125 to form a section in which no power is supplied. The driving controller 122 controls the sensor driver 123 to detect the temperature of the sensor 133 during a section (RS Sensing section in FIG. 7) in which the lens driver 121 and the heater driver 125 do not supply power to the LC lens 131 and the heater 135. Thus, the sensor driver 123 according to the embodiment may detect the temperature of the sensor 133 when the effect of the noise as a result of the power of the heater 135 is minimized.

Figure 8:
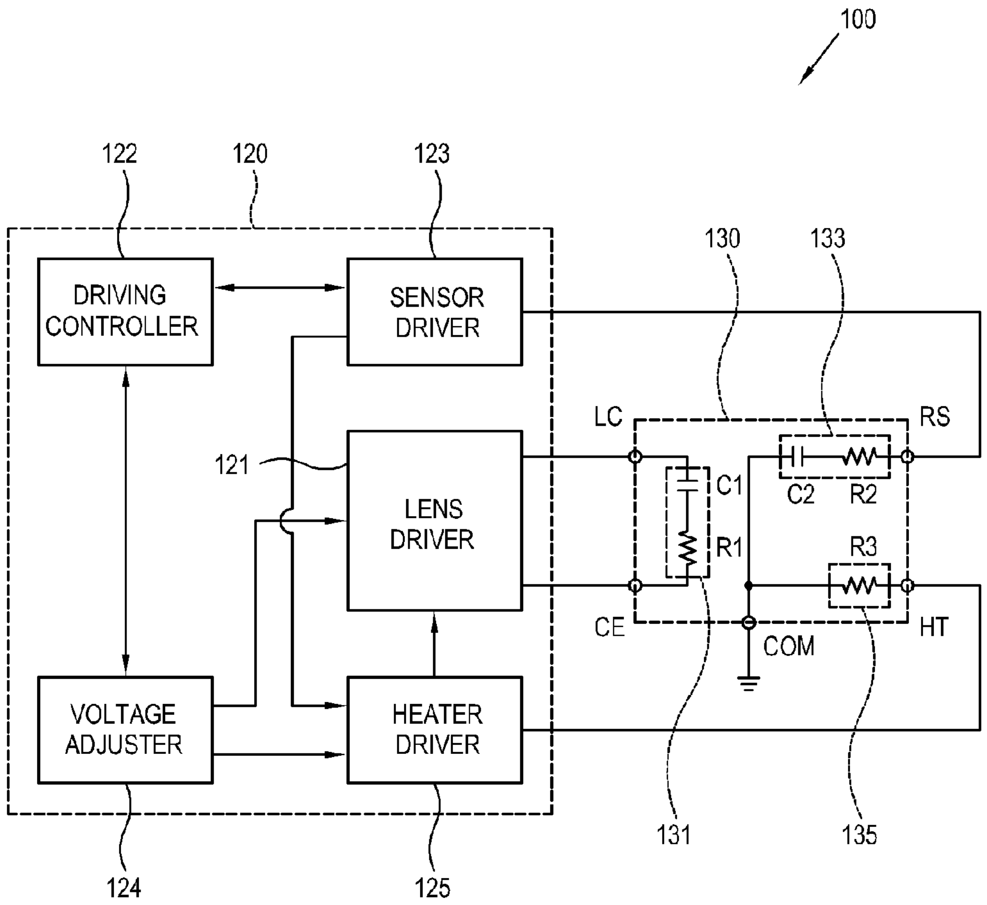
FIG. 8 is a detailed view of an LC module of an imaging apparatus according to another embodiment.
Figure 9:
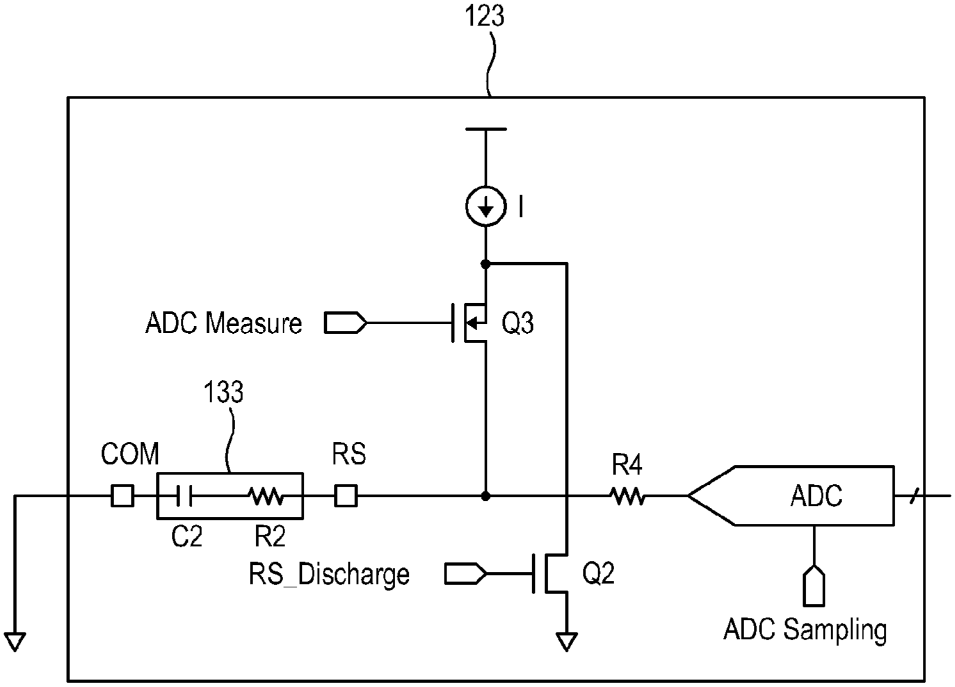
FIG. 9 is a circuit diagram explaining an operation of a sensor driver of the imaging apparatus according to the another embodiment.
Figure 10:
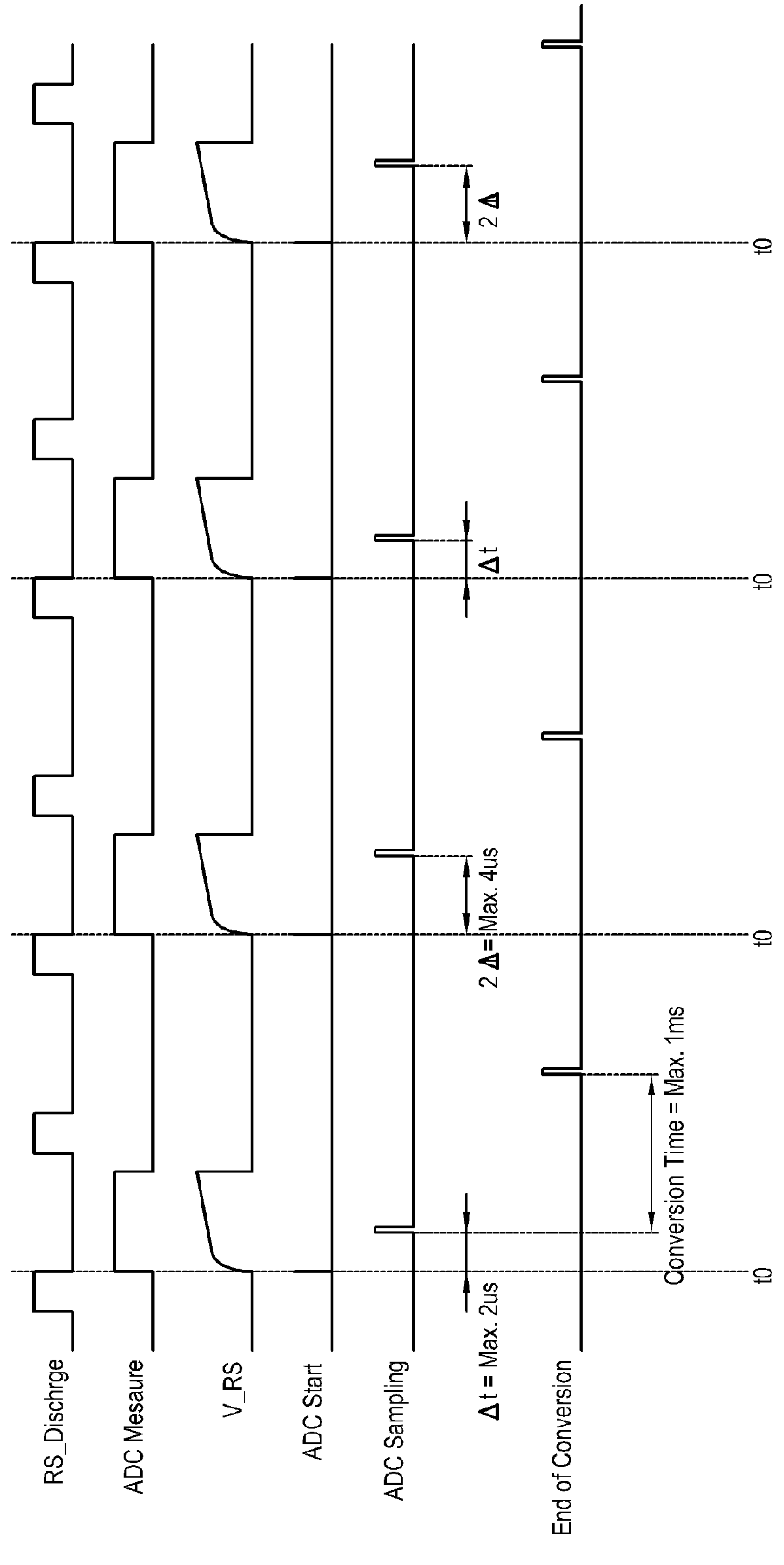
FIG. 10 is a graph showing a voltage detected by a sensor of the imaging apparatus according to the another embodiment.

FIG. 8 is a detailed view of an LC module 130 of an imaging apparatus 100 according to another embodiment. FIG. 9 is a circuit diagram explaining an operation of a sensor driver 123 of the imaging apparatus 100 according to the another embodiment. FIG. 10 is a graph showing a voltage detected by the sensor 133 of the imaging apparatus 100 according to the another embodiment.

According to the embodiment in FIGS. 8 to 10, the LC module 130 is different from the LC module in FIG. 2 (which is connected to the heater driver 125) in that one end of the heater 135 is grounded. The heater 135 in FIG. 2 may receive a ground voltage from the heater driver 125.

FIGS. 4, 6 and 8 also apply to the LC module 130 according to another embodiment.

As in FIG. 8, the LC module 130 according to another embodiment includes a single chip which has five terminals LC, CE, RS, HT and COM connectable to the outside as in the foregoing embodiment. The driver 120 which supplies power to the LC module 130 may also include a single chip having an H-bridge circuit.

As shown in FIG. 8, the LC lens 131 may include a capacitor C1 and a resistor R1. The sensor 133 may include a capacitor C2 and a resistor R2. The heater 135 may include a resistor R3.

The five terminals of the LC module 130 are connected to one of the lens driver 121, the sensor driver 123 and the heater driver 125 to transmit and receive a signal. More specifically, referring to FIG. 9, the lens driver 121 is connected to the LC and CE terminals and applies a voltage to the LC lens 131. The sensor driver 123 is connected to the RS terminal and detects a temperature of the sensor 133. The heater driver 125 is connected to the HT terminal and applies a voltage to the hater 135 through the HT terminal to generate heat by the heater 135. The COM terminal is grounded.

The heater driver 125 may supply power with 2.8 to 5V to the heater 135 at a predetermined interval.

The sensor 133 as a sensor element includes the capacitor C2 and the resistor R2 to detect a voltage of the LC lens 131 as shown in FIG. 8.

The sensor 133 detects and transmits the voltage of the LC lens 131 to the sensor driver 123. The sensor driver 123 includes an ADC converter which converts the power transmitted by the sensor 133, into a digital form.

The output voltage of the sensor 133 has such form as a voltage V in FIG. 4 and V_RS in FIG. 10 by the capacitor C2 as in FIGS. 8 and 9, and due to occurrence of an error at t0 at which the sensor 133 receives the voltage from the LC lens 131, it is difficult to detect a voltage value accurately.

The sensor driver 123 detects the voltage of the LC lens 131 at a predetermined interval (ADC Sampling) (Δt) by using COM_Discharge and RS_Discharge signals measured by the RS and ADC as in FIGS. 9 and 10. The sensor driver 123 according to the embodiment may detect voltages V1 and V2 at t1 to which t0 elapses by Δt and at t2 to which t0 elapses by 2Δt, respectively. The LC module 130 according to the embodiment in FIGS. 8 and 9 has the COM terminal receive the ground voltage, and thus does not control the COM_Discharge signal.

Q2 and Q3 in FIG. 9 perform a switching operation. As shown in FIG. 10, the sensor driver 123 according to the embodiment may measure the voltage V_RS of the sensor 133 at the time when Q2 is turned off by the RS_Discharge signal and the ADC_Measure signal is turned on. The sensor driver 123 may further include a resistor R4.

More specifically, to calculate a voltage falling under t0 of an ideal voltage without any effect from the capacitor C2 as in (a) in FIG. 6, the sensor driver 123 detects the voltages V1 and V2 at t1 and t2, respectively, as in (b) in FIG. 6 by using the ADC Sampling signal and deducts a falling under the difference between V1 and V2 from V1 to calculate the voltage V0 at t0. As in the foregoing embodiment, the formula 1 is used to calculate the voltage V0.

The sensor driver 123 determines whether the LC lens 131 maintains its temperature within a predetermined range, i.e., 40 to 50° C., by using the calculated V0. The sensor driver 123 may use a lookup table (LUT) stored regarding the temperature corresponding to the calculated voltage value to determine whether the LC lens 131 maintains a proper temperature.

The sensor driver 123 outputs to the heater driver 125 a signal showing whether the LC lens 131 maintains a proper temperature. Based on the signal transmitted by the sensor driver 123, the heater driver 124 outputs a control signal to generate heat by the heater 135.

The sensor driver 123 according to the embodiment periodically receives the voltage of the sensor 133 at every t0 in FIGS. 7 and 10, checks whether the LC lens 131 maintains a proper temperature, and the result checked by the sensor driver 123 is provided as a feedback through the heater driver 125. Thus, the LC lens 131 according to the embodiment may continue to maintain a proper temperature.

Hereinafter, a temperature controlling process of the driver 120 connected to the LC module 130 will be described with reference to FIG. 11.

Figure 11:
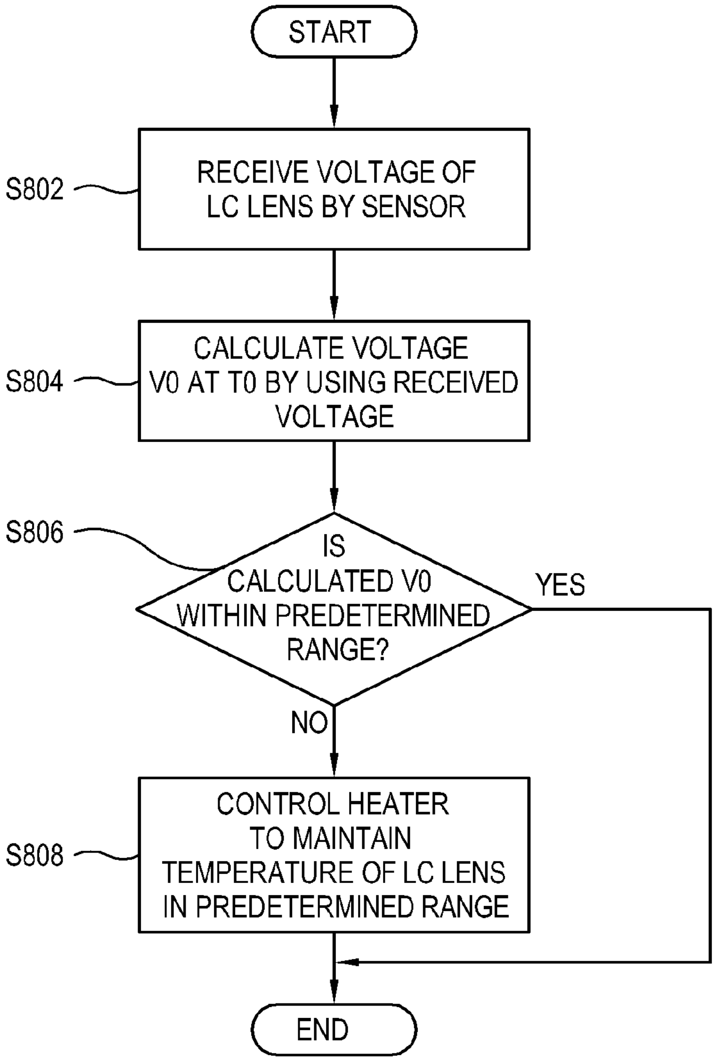
FIG. 11 is a flowchart showing a temperature controlling method of a driver for a liquid crystal lens according to the embodiment.

FIG. 11 is a flowchart showing a temperature controlling method of the driver 120 according to the embodiment.

As shown therein, the sensor 133 receives a voltage of the LC lens 131 at a predetermined interval (S802).

The sensor driver 123 calculates the voltage V0 falling under t0 in FIGS. 5, 7 and 10 by using the voltages V1 and V2 received by the sensor 133 at operation S802 (S804).

The sensor driver 123 determines whether the temperature of the LC lens 131 is within a predetermined range (e.g., within 40 to 50° C. as proper temperature), by using the voltage V0 calculated at operation S804 (S806).

The determination result at operation S806 is transmitted to the heater driver 125, and if the LC lens 131 does not maintain a proper temperature, the heater driver 125 controls the heater 135 for the LC lens 131 to maintain the proper temperature (S808).

The operations S802 to S808 may be performed at a predetermined interval as shown in FIG. 10, and accordingly the LC lens 131 may continue to maintain the proper temperature.

As described above, a driver for a liquid crystal lens, an imaging apparatus and a temperature controlling method thereof according to the embodiments detects a temperature of the liquid crystal lens accurately by compensating for a resistance value from the liquid crystal lens to thereby maintain stability of the imaging apparatus.

Further, the driver for the liquid crystal lens, the imaging apparatus and the temperature controlling method thereof according to the embodiments may compensate for a voltage error which arises by a capacitor of a sensor by compensating for a voltage of the liquid crystal lens at the time when the sensor receives power, through a simple calculation, to thereby measure and control the temperature accurately with a minimum error in the temperature.

Although a few exemplary embodiments have been shown and described, it will be appreciated by those skilled in the art that changes may be made in these exemplary embodiments without departing from the principles and spirit of the invention, the range of which is defined in the appended claims and their equivalents.

What is claimed is:

1. A driver for a liquid crystal lens comprising:

a liquid crystal lens which adjusts a focal length according to a voltage applied thereto;

a lens driver which applies the voltage to the liquid crystal lens;

a sensor which detects a first voltage corresponding to a first time and a second voltage corresponding to a second time of the liquid crystal lens at a predetermined interval;

a sensor driver which detects a temperature of the liquid crystal lens by receiving a voltage from the sensor, calculates a compensated voltage corresponding to an ideal voltage at a receiving time of a voltage received by the sensor from the liquid crystal lens using the first voltage and the second voltage, estimates a compensated temperature corresponding to the compensated voltage for the detected temperature of the liquid crystal lens, and determines whether the compensated temperature maintains a preset range for the driver for the liquid crystal lens to perform a control operation; and a heater driver which, according to the determination by the sensor driver, controls heat generation of the liquid crystal lens to maintain a temperature of the liquid crystal lens in the preset range, wherein the first time elapses from the receiving time by the predetermined interval and the second time elapses from the first time by the predetermined interval, and the compensated voltage is calculated by subtracting a difference between the first voltage and the second voltage from the first voltage.

2. The driver according to claim 1, wherein the sensor comprises a capacitor and a resistor and receives a voltage of the liquid crystal lens, and the sensor driver calculates the compensated voltage, thereby compensating for a voltage error which arises due to the capacitor.

3. The driver according to claim 2, further comprising a heater which generates heat according to a control of the heater driver, wherein the liquid crystal lens, the sensor and the heater form a single chip comprising five terminals.

4. The driver according to claim 3, wherein the five terminals are connected to at least one of the lens driver, the sensor driver and the heater driver to transmit and receive a signal.

5. The driver according to claim 3, wherein four of the five terminals are connected to at least one of the lens driver, the sensor driver and the heater driver to transmit and receive a signal and the remaining one of the five terminals is grounded.

6. The driver according to claim 1, wherein the lens driver adjusts a frequency of a voltage applied to the liquid crystal lens to adjust a focus of the liquid crystal lens.

7. The driver according to claim 1, further comprising a heater which generates heat according to a control of the heater driver, wherein the liquid crystal lens, the sensor, and the heater are included in a liquid crystal module comprising at least five terminals, the lens driver is connected to first and second terminals of the liquid crystal module to apply the voltage to the liquid crystal lens, the sensor driver is connected to a third terminal of the liquid crystal module to detect the temperature of the liquid crystal lens by receiving the voltage from the sensor, and the heater driver is connected to fourth and fifth terminals of the liquid crystal module to apply a voltage to the heater.

8. A temperature controlling method of a driver for a liquid crystal lens comprising:

detecting a temperature of a liquid crystal lens by detecting a first voltage corresponding to a first time and a second voltage corresponding to a second time of the liquid crystal lens at a predetermined interval and adjusting a focal length according to a voltage applied thereto;

calculating a compensated voltage corresponding to an ideal voltage at a receiving time of a voltage received by the sensor from the liquid crystal lens using the first voltage and the second voltage, and estimating a compensated temperature corresponding to the compensated voltage for the detected temperature;

determining whether the compensated temperature maintains a preset range for the driver for the liquid crystal lens to perform a control operation; and controlling heat generation of the liquid crystal lens according to the determination, to maintain the temperature of the liquid crystal lens in the preset range, wherein the first time elapses from the receiving time by the predetermined interval and the second time elapses from the first time by the predetermined interval, and the compensated voltage is calculated by subtracting a difference between the first voltage and the second voltage from the first voltage.

9. The method according to claim 8, wherein the sensor comprises a capacitor and a resistor and receives a voltage of the liquid crystal lens, wherein the calculating the compensated voltage comprises compensating for a voltage error which arises due to the capacitor.

10. An imaging apparatus comprising:

a liquid crystal lens which adjusts a focal length according to a voltage applied thereto;

a lens driver which applies the voltage to the liquid crystal lens;

a sensor which detects a first voltage corresponding to a first time and a second voltage corresponding to a second time of the liquid crystal lens at a predetermined interval;

a sensor driver which detects a temperature of the liquid crystal lens by receiving a voltage from the sensor, calculates a compensated voltage corresponding to an ideal voltage at a receiving time of a voltage received by the sensor from the liquid crystal lens using the first voltage and the second voltage, estimates a compensated temperature corresponding to the compensated voltage for the detected temperature of the liquid crystal lens, and determines whether the compensated temperature maintains a preset range for the imaging apparatus to perform a control operation;

a heater driver which controls heat generation of the liquid crystal lens to maintain the temperature of the liquid crystal lens in the preset range according to the determination of the sensor driver;

an imaging sensor which detects an image transmitted by the liquid crystal lens; and an image processor which processes an image obtained through the image sensor, wherein the first time elapses from the receiving time by the predetermined interval and the second time elapses from the first time by the predetermined interval, and the compensated voltage is calculated by subtracting a difference between the first voltage and the second voltage from the first voltage.

11. The imaging apparatus according to claim 10, wherein the lens driver adjusts a frequency of a voltage applied to the liquid crystal lens to adjust a focus of the liquid crystal lens.

* * * * *